US009580045B2

(12) United States Patent
Holub et al.

(10) Patent No.: US 9,580,045 B2
(45) Date of Patent: Feb. 28, 2017

(54) CONFIGURABLE ELECTRONIC BRAKE SHIFT INTERLOCK OVERRIDE

(75) Inventors: Patrick K. Holub, Novi, MI (US); John R. Van Wiemeersch, Novi, MI (US); Steven Y. Schondorf, Dearborn, MI (US); George F. MacDonald, West Bloomfield, MI (US); Johannes Huennekens, Ocean Grove (AU); Graham Mace, Basildon (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 921 days.

(21) Appl. No.: 13/510,310

(22) PCT Filed: Jan. 18, 2010

(86) PCT No.: PCT/US2010/021303
§ 371 (c)(1),
(2), (4) Date: May 17, 2012

(87) PCT Pub. No.: WO2011/087513
PCT Pub. Date: Jul. 21, 2011

(65) Prior Publication Data

US 2012/0232765 A1 Sep. 13, 2012

(51) Int. Cl.

| | |
|---|---|
| ***G06F 7/00*** | (2006.01) |
| ***G06F 17/00*** | (2006.01) |
| ***G06F 19/00*** | (2011.01) |
| ***B60R 25/08*** | (2006.01) |
| *F16H 59/10* | (2006.01) |

(52) U.S. Cl.
CPC ........... *B60R 25/08* (2013.01); *B60R 25/086* (2013.01); *F16H 59/10* (2013.01)

(58) Field of Classification Search
CPC ........ B60R 25/08; B60R 25/086; F16H 59/10
USPC ............. 701/2, 66; 180/271, 287; 307/10.3; 340/426.17, 5.8, 528, 5.63, 5.65, 5.28; 477/96, 97, 99
See application file for complete search history.

(56) References Cited

U.S. PATENT DOCUMENTS

| | | | |
|---|---|---|---|
| 5,014,038 | A | 5/1991 | Keigh-Monstevens et al. |
| 5,247,279 | A | 9/1993 | Sato |
| 5,255,570 | A | 10/1993 | Shirahama et al. |

(Continued)

FOREIGN PATENT DOCUMENTS

JP 2009143528 A * 7/2009

*Primary Examiner* — Khoi Tran
*Assistant Examiner* — Isaac Smith
(74) *Attorney, Agent, or Firm* — Frank MacKenzie; MacMillan, Sobanski & Todd, LLC

(57) ABSTRACT

Method and apparatus for an electronic override of the brake shift interlock in a motor vehicle can provide for the vehicle to be manually pushed while it is parked without keys. A timed window is initiated upon detection of a parked state of the vehicle with its transmission in a park position and ignition key removable or removed. Selection of an out-of-park position is inhibited. The invention monitors activation of the brake pedal during the timed window. Override of the brake shift interlock is enabled while the brake pedal is activated during the timed window, thereby allowing selection of an out-of-park shifter position. The timed window ends after a predetermined time or event (e.g., after the driver's door is opened) to inhibit any further shifter movement from the park position until the next ignition key-cycle.

19 Claims, 2 Drawing Sheets

35 Key Is In
36 Shifter In Park? N Y
37 Key Off And Out
38 Function Allowable? N Y
39 Done, Solenoid Deactivated
40 Function Enabled? N Y
41 Start Timer
42 Driver Door Ajar? Y N
43 Time Expired? Y N
44 Brake Depressed? N Y
45 Deactivate Solenoid (Lock), or Invalidate Shift Requests
46 Actuate Solenoid (Unlock), or Validate Shift Requests

(56) References Cited

U.S. PATENT DOCUMENTS

| | | | | |
|---|---|---|---|---|
| 5,783,994 | A * | 7/1998 | Koopman et al. | 340/426.36 |
| 5,919,112 | A * | 7/1999 | Michael et al. | 477/99 |
| 6,879,480 | B2 | 4/2005 | Kalia | |
| 6,976,569 | B2 | 12/2005 | Khaykin et al. | |
| 2003/0141130 | A1* | 7/2003 | Fleming et al. | 180/271 |
| 2004/0046639 | A1* | 3/2004 | Giehler et al. | 340/5.63 |
| 2005/0266958 | A1 | 12/2005 | Ehrmaier | |
| 2008/0045381 | A1 | 2/2008 | Vermeersch et al. | |
| 2011/0068895 | A1* | 3/2011 | Gee et al. | 340/5.67 |

* cited by examiner

CONFIGURABLE ELECTRONIC BRAKE SHIFT INTERLOCK OVERRIDE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to manual override of a brake transmission shift interlock system, and, more specifically, to an electronic override feature that allows the driver to place the vehicle's transmission in an unlocked condition by taking a deliberate action during a brief opportunity when parking the vehicle.

The brake shift interlock (BSI) feature, also known as the brake transmission shift interlock (BTSI), is a commonly used rollaway theft prevention feature that locks the automatic transmission shift lever portion of the transmission range selector mechanism in the park position such that it can be released only when the ignition switch is in the run or start position—thereby requiring an ignition key. As further safety against unintended movement, release of the shifter from the park position also requires depression (i.e., activation) of the vehicle brake pedal. Conventional BTSI systems further require the transmission shift lever to be in the park position before allowing the ignition key to be removed from the ignition switch when securing and vacating the vehicle. Such an interlock is required by regulations in many jurisdictions, such as FMVSS 114 in the United States.

A typical BTSI system utilizes a spring-activated, solenoid-returned locking pin in the range selection mechanism that prevents shift lever movement away from (i.e., out of) the park position. Conventional transmission range positions are identified as PRNDL, including park, reverse, neutral, drive, and low. The BTSI interlock solenoid and locking pin selectably inhibit or enable changes from the park position to the out-of-park positions (i.e., R, N, D, and L). In the event of a failure of the electrical system or a malfunction of the solenoid for releasing the locking pin, an optional, mechanical manual override is permitted by FMVSS 114 and most similar regulations globally, and is usually included by the manufacturer. However, to preserve some of the intended theft prevention attribute and to discourage non-service usage of it by customers, FMVSS 114 and most similar regulations require a manual override design which is only accessible or operable by a tool or a key. Since a "service-only" manual override mechanism is intended to be difficult to access and rarely used, the hardware is usually designed to withstand only infrequent (i.e. low duty-cycle) usage. When accessed frequently or by someone other than trained service personnel, these conventional service manual override mechanisms may be easily damaged.

For economic and complexity management reasons, a vehicle manufacturer typically desires to utilize a single hardware design for a particular vehicle model regardless of the global markets into which that model is sold. However, there are significant regional differences in the needs, associated regulations, and customer behavior associated with some hardware, such as the BTSI system and its mechanical service override. This range of differences extends from jurisdictions that prohibit the inclusion of a mechanical service override to those that require daily usage of the override by many drivers and would prefer BTSI deletion. For example, in some markets in Southeast Asia, rollaway vehicle theft does not often occur. Therefore, no corresponding regulations have been put in place to require a BTSI system. Furthermore, many urban areas in the region are characterized by chronically inadequate space for vehicle parking. In many such places, it has become customary, and often required, to double park vehicles (i.e., in two parallel rows along the edge of a street and in parking structures) while leaving the blocking cars locked with their transmissions out of park (e.g., in neutral), their parking brakes off, and their wheels aligned straight so that drivers of other vehicles can push them out of the way as needed in order to access a blocked parking spot—either when arriving or departing. Such customs evolved easily since most Southeast Asia vehicles included manual transmissions and have no BTSI or other feature to prevent parking in neutral. However, this customer behavior has migrated to drivers of the increasing automatic transmissions market segment in the region. Drivers of automatic transmission vehicles equipped with the standard FMVSS 114 compliant BTSI and mechanical service override have been forced to use this override for their "neutral" parking purposes. This has resulted in problems associated with overuse of the manual override which is intended to only support low duty cycle, service-only use. Further, the designed-in inconvenience of the tool or key access mandated by FMVSS 114 has resulted in customer dissatisfaction with its ergonomics and ease of use.

Some vehicle manufacturers have introduced redesigned mechanical manual override hardware specifically for these markets that is easy enough and durable enough for daily use by drivers. These designs have exposed push-buttons that require no tools to access or actuate, and like the service override, are completely manual and have no brake activation requirement. Even though these designs have been readily accepted by customers as significant improvements to their most important problems, they represent a compromise solution that creates or increases other problems.

Firstly, such high duty cycle mechanical manual override hardware is usually more expensive and increases tooling, engineering, and complexity costs for the vehicle manufacturer. Most importantly, however, by providing uninhibited ease of access, the ability of the BTSI to fulfill its two primary design objectives has been completely compromised; namely, rollaway theft prevention and required brake actuation when shifting from park. Further, these push-buttons are easily accessible by children or front seat passengers of parked vehicles who may not have ready access to the brakes if shifter movement results in vehicle movement.

The present invention overcomes the shortcomings of both types of manual overrides without tradeoffs or compromises in the desirable attributes for any particular jurisdiction and without increases in cost or complexity.

SUMMARY OF THE INVENTION

The present invention has the advantages of permitting the driver of a vehicle to choose during parking of that vehicle whether to leave it in a state that will allow others to push the vehicle in their absence (i.e., in neutral without a key). After removing the key, the driver is given an opportunity during a timed window to shift the transmission out of park (so the vehicle will be movable). If not done during the timed window, the vehicle will be left in a state requiring use of the ignition key to release the interlock. Thus, when the ability to leave the car movable is not needed (e.g., not being double-parked), full anti-theft protection can be maintained. No additional or distinct hardware is required other than what is present in a conventional, electronic control unit (ECU) driven BTSI system. The feature control software within the ECU may be made configurable so that it can be common globally, with easily settable (configurable) software flags enabling or disabling the feature based on jurisdiction and/or customer allowance of the feature.

In one aspect of the invention, a method and apparatus are provided for an electronic override of the brake shift interlock in a motor vehicle that allows a vehicle to be manually pushed while it is parked without keys. A timed window is initiated upon detection of a parked state of the vehicle with its transmission in a park position and its ignition key removable or removed. Selection of an out-of-park position is inhibited. The invention monitors activation of the brake pedal during the timed window. Override of the brake shift interlock is enabled while the brake pedal is activated during the timed window, thereby allowing selection of an out-of-park shifter position. The timed window ends after a predetermined time or event (e.g., after the driver's door is opened) to inhibit any further shifter movement from the park position until the next ignition key-cycle.

In addition to the parking applications described above, the invention could be used in connection with enabling the flat towing of a vehicle (e.g., towing a car behind a motor home) without the necessity of leaving a key in the ignition, if permitted by local regulations. The invention would thus provide increased anti-theft security of the towed vehicle.

DETAILED DESCRIPTION OF PREFERRED EMBODIMENTS

Figure 1:
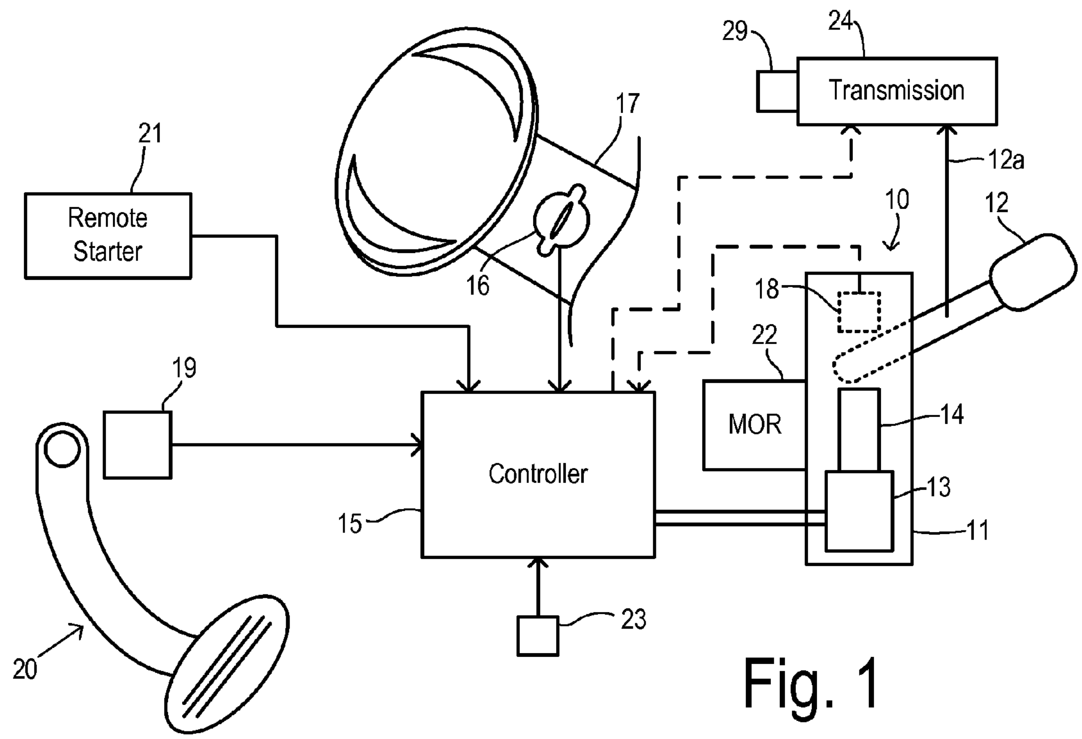
FIG. 1 is a schematic, block diagram showing a vehicular system including a BTSI.

Referring to FIG. 1, a transmission range selector system 10 includes a base 11 supporting a shift lever 12. A solenoid 13 controls a locking pin 14 which interfaces with lever 12. Locking pin 14 is spring loaded to interact with lever 12 so that when lever 12 is placed in the park position it cannot be shifted out of park unless solenoid 13 retracts locking pin 14 against the spring (not shown).

A controller 15 (such as a body control module) is coupled to solenoid 13 for causing retraction of locking pin 14 when desired. Controller 15 receives an ignition switch signal from an ignition switch 16 mounted on a steering column 17. Shift lever 12 may be mechanically linked to the transmission 24 to control the transmission range selection directly (e.g., through a shift cable 12*a*) or may be coupled to controller 15 and transmission 24 through a shift lever position sensor 18 or other standalone device for identifying and communicating the driver's intended (i.e., desired) transmission range position (e.g., in a shift-by-wire system).

A transmission range sensor 29 determines which transmission range the transmission 24 is currently in, and provides a corresponding signal to controller 15.

Controller 15 further receives an input signal from a brake sensor 19 that is coupled to a brake pedal mechanism 20 to identify when the brake pedal is activated. Controller 15 is further coupled to a remote starter 21 to monitor when a remote start function is active (i.e., the engine is running but the ignition key is not in the ignition switch). Controller 15 also receives a "door ajar" signal from a driver's door ajar sensor 23 for a purpose that is explained below.

In the system of FIG. 1, a mechanical manual override (MOR) 22 is comprised of a mechanical device for accessing and physically moving locking pin 14 in a manner that releases lever 12. In the system of the present invention, the electronic means of override of the present invention completely eliminates the need for an easy-access, high duty-cycle mechanical MOR 22. However, the optional, tool accessible, low duty-cycle version of MOR 22 may be retained to facilitate vehicle service of the electronic or electro-mechanical failure modes that are incompatible with the electronic means of override. Thus, the invention can be considered to provide a supplemental electronic MOR function, where permitted by law. If alternative service access is not prohibitively slow or difficult, the optional service override components and their associated extra cost may be deleted entirely in order to provide a single global shifter design without any mechanical MOR.

Figure 2:
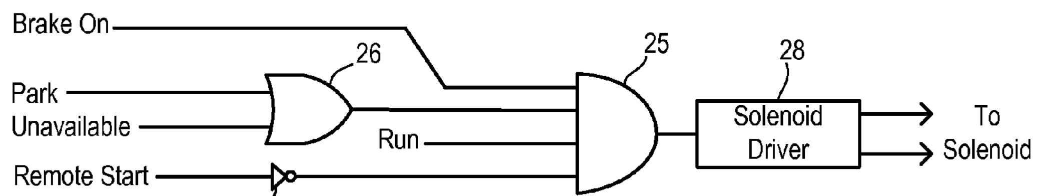
FIG. 2 is a logic diagram showing the conditions under which a typical prior art system permits movement out of a park position of the shift lever.

FIG. 2 summarizes the prior art logic implemented in a controller for releasing the BTSI to allow shifting out of park for purposes of driving the vehicle (i.e., when the key is in the ignition). AND-gate 25 has a first input receiving a "Brake On" signal indicative of whether the brake pedal is depressed. AND-gate 25 receives a second input from an OR-gate 26 which receives a first logic signal indicating whether the shift lever is in park and a second logic signal indicating whether the current shift lever position is unavailable or not known (e.g., due to a failure of transmission range sensor 29). If the shift lever is in the park position or its position is not known, then a high logic level signal is provided to AND-gate 25 from OR-gate 26. A third input of AND-gate 25 receives the "run" signal from the ignition switch. A fourth input of AND-gate 25 has an inverted logic level from an inverter 27 which receives a "Remote Start" status signal at its input which indicates whether a remote start sequence is active. Thus, the fourth input has a high logic level signal to indicate when a remote start is not in progress. AND-gate 25 provides a high logic level output signal only upon simultaneous existence of the following conditions: 1) the brake is activated, 2) the transmission and shift lever are in park (or its position is unknown), 3) the ignition switch is in the run position, and 4) a remote start process is not active. In response to a high logic level signal from AND-gate 25, a driver circuit 28 provides electric power to the solenoid to unlock the shift lever so that the driver of the vehicle is able to move the shift lever out of park.

Figure 3:
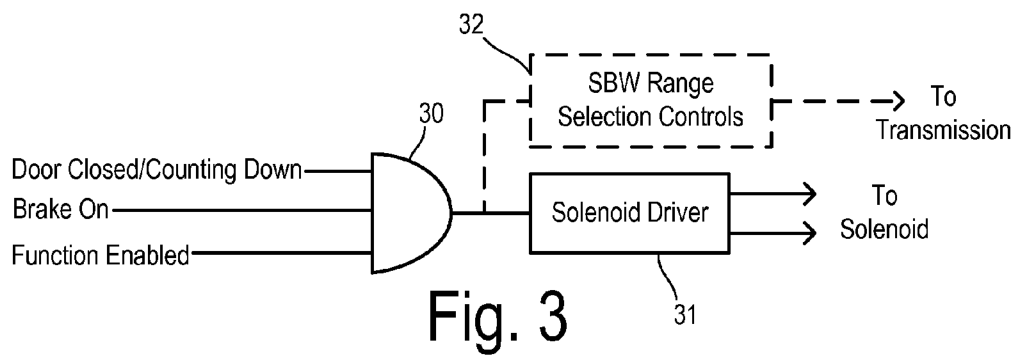
FIG. 3 is a logic diagram showing conditions for enabling a manual override according to the present invention.

In addition to the BTSI unlock conditions shown in FIG. 2, the present invention implements the logic summarized in FIG. 3 to allow shifting out of park during certain circumstances when the ignition key is not present. The present invention can be considered as an electronic supplementary manual override function. In a preferred embodiment, the supplemental MOR function is enabled according to two configuration bits or flags in the controller, both of which must be set to "on". The first bit is a "key-out BTSI activation allowable" flag that is set (preferably by the vehicle manufacturer or a service provider) based on the regulations and feature demand of the destination country or jurisdiction where the vehicle is to be sold and/or used. The second bit is a "key-out BTSI activation enabled" flag which is configurable by the customer and/or vehicle owner using a vehicle human machine interface (HMI) and/or a service tool. In the invention, the key-lock solenoid operation is unchanged in that it still requires the PRNDL shift lever to be placed into the park position before enabling removal of the ignition key. If allowed by the setting of the two configuration bits, the electronic BTSI solenoid activation function is expanded to include a predetermined time (such as thirty seconds immediately after removal of the ignition key). Activation of the BTSI solenoid can then be obtained by stepping on the brake pedal (i.e., the same as when the ignition key is in the run position) to allow movement of the shift lever out of the park position. Thus, a deliberate action is required by the owner so that when they forego this deliberate action, the vehicle will be parked with the continued anti-theft protection of the BTSI function. In the preferred embodiment, expiration of the thirty second timer or the opening of the driver door immediately disables the electronic BSTI override function.

Referring to FIG. 3, the controller logic for one preferred embodiment is modeled by an AND-gate 30 receiving a first signal indicating that the driver door is closed and the thirty second exit timer is still active and counting down. A second logic signal that is input to AND-gate 30 is comprised of the Brake-On signal. A third input corresponds to the two configuration bits that are set to enable the electronic MOR function. The output of AND-gate 30 is coupled to a driver circuit 31 for operating the solenoid in a conventional manner. Alternatively, the invention may be implemented in a vehicle with a transmission shift by wire (SBW) system. In a SBW system, SBW range selection controls 32 validate or invalidate the driver's range selection request signals from shift lever position sensor 18 or other standalone device(s) (e.g., rotary selector knobs or switches) and subsequently outputs electronic range selection control signals to the transmission 24 or provides direct physical range selection control (e.g., through shift cable 12*a*). In an SBW embodiment, the output of AND-gate 30 is provided to the SBW control logic, or incorporated within such logic, to provide the electronic MOR function as appropriate.

Figure 4:
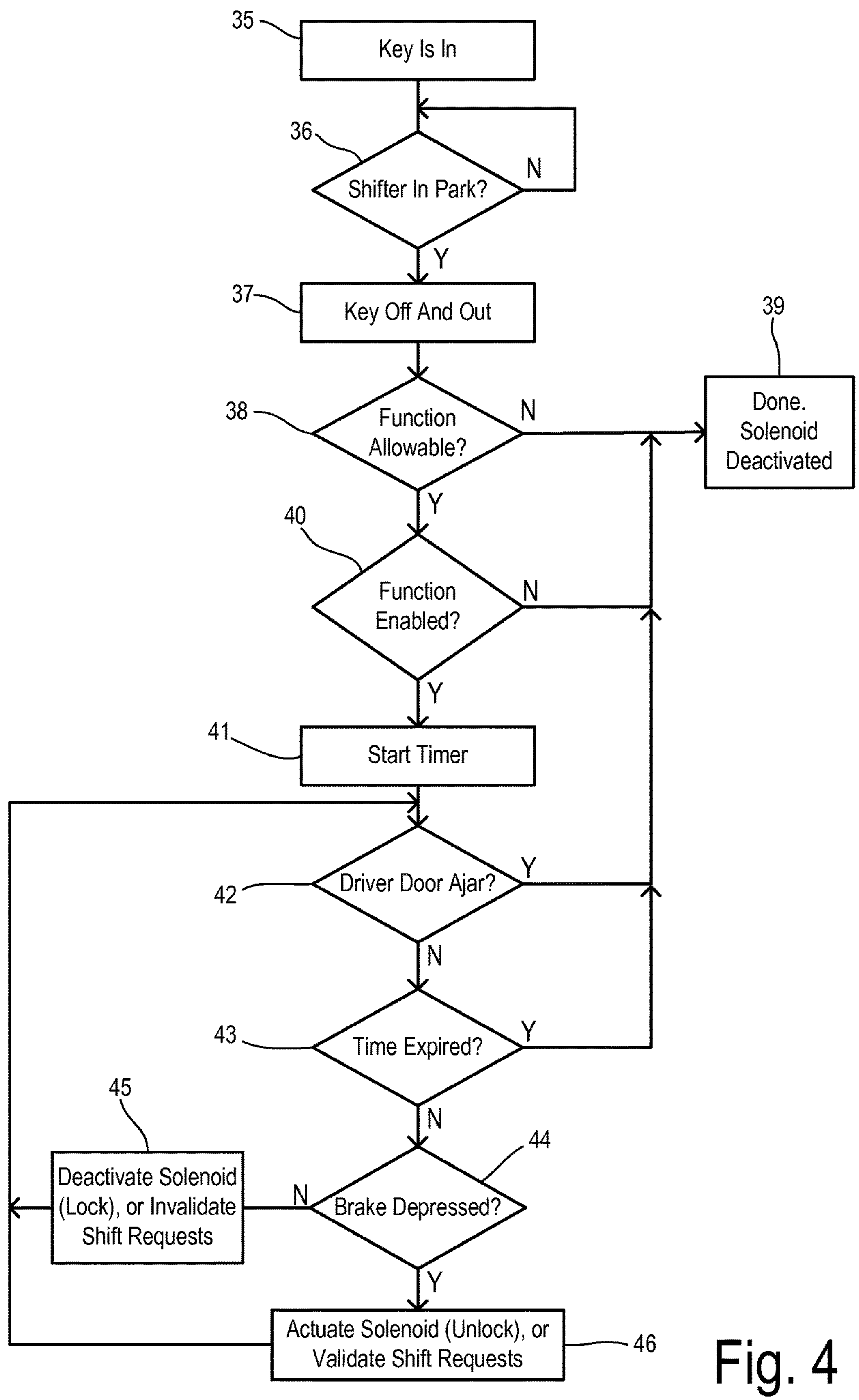
FIG. 4 is a flowchart showing one preferred method of the invention.

A method of the present invention is shown in greater detail in FIG. 4. In step 35, the vehicle is being driven and the key is in the ignition. A check is made in step 36 to determine whether the shifter has been placed in the park position. If not, continued checks are made. When the shift lever has been placed in the park position, the method proceeds to step 37 when the driver turns the ignition switch off and pulls the ignition key out of the ignition switch. A parked state of the vehicle is detected in response to the placement of the shift lever into the park position and the ignition key being removed. At this point, the BTSI lockout function causes the shift lever (and the transmission) to be locked in the park position.

A check is made in step 38 to determine whether the electronic MOR function is allowable based on the "key out BTSI activation allowable" configuration bit. If not allowed, then the method completes at step 39 with the BTSI solenoid still deactivated. If the function is allowable, then a check is made in step 40 to determine whether the function has been enabled by the customer (by checking the "key out BTSI activation enabled" bit). If not enabled, then the method is completed at 39. If the function has been enabled, then a timer is started in step 41 corresponding to a predetermined time, such as 30 seconds. The timer establishes a driver action window during which the electronic MOR function will be available to the driver. As seen below, the driver action window may end with the expiration of the predetermined time (i.e., the elapsed time equals the predetermined time) or upon opening of the driver's door (or any other desired action to be taken by the driver).

With the timer running, a check is made in step 42 to determine whether the driver door is ajar (i.e., open). As soon as the door opens, the solenoid is deactivated in step 39. If the door has not yet opened, then a check is made in step 43 to determine whether the timer has expired. If so, then a return is made to step 39 and the solenoid is deactivated. If the time has not expired, then a check is made in step 44 to determine whether the brake pedal has been depressed (i.e., the brake sensor is active). If not, then the solenoid continues to be deactivated or locked in step 45. Alternatively, in an SBW system, any shift requests out of park are invalidated in step 45. A return is then made to step 42 to continue checking the door condition.

If the brake has been depressed in step 44, then the BTSI solenoid is actuated (i.e., unlocked) in step 46. In an SBW embodiment, a state is initiated in which shift requests out of park are validated. Then a return is made to step 42. Thus, the electronic manual override function allows the driver to move the shift lever out of the park position during the driver action window as long as the brake pedal is detected as being activated and the predetermined period of time has not yet expired.

The present invention provides a software-only solution that can be reused across vehicle lines globally and provides each particular model with the ability to either include or not include the most durable and easiest to use manual override function for daily use where needed without adding wiring complexity, distinct hardware or trim panels, or unique tooling. Complexity management of the required automatic vehicle configuration by the vehicle assembly plant is far easier and less costly than management of the alternative trim hardware complexity. Most importantly, however, this invention does this while restoring the ability of the BTSI to fulfill its two primary design objectives—namely rollaway theft prevention and required brake actuation when shifting from park. Further, the combination of the brake pedal and door ajar inputs prevent child or front seat passenger access in addition to the theft prevention benefit provided by the timer, and ensures ready access to the brakes if shifter movement from park results in vehicle movement.

Also as stated before, by providing an electronic means of override, a vehicle manufacturer may choose to eliminate the cost associated with having any mechanical shifter override hardware since it is not required by any market and must be disabled for some that do not permit it.

What is claimed is:

1. A method for electronically controlling a shifter lockout function of a vehicle while parked, wherein the vehicle includes a brake pedal and a transmission having a park position and a plurality of out-of-park positions, and an ignition switch for receiving an ignition key, the method comprising the steps of:

detecting the beginning of a parked state of the vehicle with the transmission in the park position;

inhibiting selection of an out-of-park position;

establishing a driver action window in response to detection of the parked state and the ignition key removed from the ignition switch;

detecting whether the brake pedal is activated during the driver action window;

if an activation of the brake pedal is detected during the driver action window, then enabling selection of an out-of-park position while activation of the brake pedal continues; and if an end of the driver action window is detected, then continuing inhibiting shifter movement from the park position during the remainder of the parked state.

2. The method of claim 1 wherein the driver action window is comprised of a predetermined period of time, and wherein detecting the end of the driver action window comprises measuring an elapsed time.

3. The method of claim 2 wherein the predetermined period of time is about 30 seconds.

4. The method of claim 2 wherein the vehicle further includes a driver's door and a driver's door ajar sensor, and wherein detecting the end of the driver action window further comprises detecting an opening of the driver's door in response to the driver door ajar sensor.

5. The method of claim 1 wherein the beginning of the parked state is detected in response to turning off an ignition switch and removal of a key from the ignition switch.

6. The method of claim 1 wherein the vehicle includes an interlock solenoid for selectably inhibiting or enabling changes from the park position to the out-of-park positions.

7. The method of claim 1 wherein the vehicle includes transmission shift-by-wire range selection controls, and wherein inhibiting or enabling changes from the park position to the out-of-park positions are comprised of selectably validating or not validating driver range selection requests by the selection controls.

8. The method of claim 7 wherein the out-of-park position that is enabled when brake activation occurs during the driver action window is comprised of a neutral transmission range position.

9. The method of claim 1 wherein the vehicle has an electronic memory storing a configurable software flag, and wherein the establishment of the driver action window is conditioned on the configurable flag.

10. The method of claim 9 further comprising the step of setting the configurable flag according to whether the vehicle is to be used in a jurisdiction that allows selection of an out-of-park position when in a parked state.

11. The method of claim 9 further comprising the step of setting the configurable flag according whether the driver or owner of the vehicle desires to allow selection of an out-of-park position when in a parked state.

12. A motor vehicle, comprising:

a brake pedal;

a brake activation sensor;

a transmission range selector;

an ignition switch; and a controller for initiating a timed window in response to a key being, removed from the ignition switch with the transmission range selector in a park position, and during the timed window enabling the shift selector to move from the park shifter position in response to the sensor indicating activation of the brake pedal.

13. The motor vehicle of claim 12 further comprising a door ajar sensor associated with a driver's door, wherein the controller terminates the timed window when the door ajar sensor indicates that the driver's door is open.

14. The motor vehicle of claim 12 further comprising an interlock solenoid for selectably inhibiting or enabling changes from the park shifter position.

15. The motor vehicle of claim 12 further comprising a transmission shift controller operating with shift-by-wire controls, and wherein inhibiting or enabling movement from the park shifter position is comprised of selectably validating or not validating driver range selection requests by the controller.

16. The motor vehicle of claim 12 further comprising an electronic memory storing a configurable software flag, and wherein initiation of the timed window is conditioned on the configurable flag.

17. The motor vehicle of claim 16 wherein the configurable flag is set according to whether the vehicle is to be used in a jurisdiction that allows selection of an out-of-park position when in a parked state.

18. The motor vehicle of claim 16 wherein the configurable flag is set according to whether the driver or owner of the vehicle desires to allow selection of an out-of-park position when in a parked state.

19. A method of brake shift interlock override, comprising:

initiating a timed window upon detection of a parked state of a vehicle with its transmission in a park position with a removed ignition key;

inhibiting selection of an out-of-park position;

detecting whether the brake pedal is activated;

enabling selection of an out-of-park position while the brake pedal is activated during the timed window; and ending the timed window after a predetermined time.

* * * * *